(12) United States Patent
Tamol

(10) Patent No.: US 8,777,130 B2
(45) Date of Patent: Jul. 15, 2014

(54) DIPOLE TRIBOELECTRIC INJECTOR NOZZLE

(75) Inventor: Ronald A. Tamol, Midlothain, VA (US)

(73) Assignee: Ronnell Company, Inc., Midlothian, VA (US)

( * ) Notice: Subject to any disclaimer, the term of this patent is extended or adjusted under 35 U.S.C. 154(b) by 372 days.

(21) Appl. No.: 13/205,810

(22) Filed: Aug. 9, 2011

(65) Prior Publication Data

US 2012/0037128 A1 Feb. 16, 2012

Related U.S. Application Data

(60) Provisional application No. 61/372,292, filed on Aug. 10, 2010.

(51) Int. Cl.
*F02M 59/00* (2006.01)

(52) U.S. Cl.
USPC ............... 239/533.2; 239/533.12; 123/536; 123/538

(58) Field of Classification Search
USPC ........ 123/536–538, 169 E, 169 EL, 169 MG, 123/608; 239/DIG. 19, 533.2–533.12, 239/585.1–585.5; 313/124, 130, 131 R, 136, 313/141, 143–145
See application file for complete search history.

(56) References Cited

U.S. PATENT DOCUMENTS

| | | | |
|---|---|---|---|
| 3,110,294 A | 11/1963 | Nyman | |
| 4,188,296 A | 2/1980 | Fujita | |
| 4,316,582 A | 2/1982 | Kobayashi et al. | |
| 4,373,494 A | 2/1983 | McMahon | |
| 4,546,923 A * | 10/1985 | Ii | 239/406 |
| 4,572,145 A | 2/1986 | Mitchell et al. | |
| 5,129,382 A | 7/1992 | Stamps, Sr. et al. | |
| 5,167,782 A | 12/1992 | Marlow | |
| 5,507,267 A * | 4/1996 | Stuer | 123/537 |
| 5,772,928 A | 6/1998 | Holtzman | |
| 5,922,398 A | 7/1999 | Hermes et al. | |
| 6,276,617 B1 * | 8/2001 | Lenhardt | 239/590 |
| 6,564,777 B2 * | 5/2003 | Rahardja et al. | 123/467 |

(Continued)

FOREIGN PATENT DOCUMENTS

| | | | | |
|---|---|---|---|---|
| EP | 1783353 | | 5/2007 | |
| JP | 61153137 A * | | 7/1986 | B01J 19/08 |
| WO | 2004063628 | | 7/2004 | |

OTHER PUBLICATIONS

International Application No. PCT/US2011/047030; International Preliminary Report on Patentability and Written Opinion of the International Searching Authority; Report; Date of Mailing Feb. 21, 2013; 7 pages.

(Continued)

*Primary Examiner* — Thomas Moulis
*Assistant Examiner* — Joseph Dallo
(74) *Attorney, Agent, or Firm* — Thomas, Karceski & Karmilovich, P.C.

(57) ABSTRACT

The present invention relates to a fuel injector configuration that treats a dielectric fluid such as gasoline fuel with strong electric and, optionally, magnetic fields to form a homogeneous charged fuel or fuel/air mixture for combustion in an internal combustion engine. The electric field is supplied by a triboelectric dipole and the magnetic field is supplied by permanent magnets. Small charged fuel particles are produced and combust more readily than untreated particles. Fuel efficiency is increased and emissions are reduced.

20 Claims, 4 Drawing Sheets

(56) References Cited

U.S. PATENT DOCUMENTS

| | | | |
|---|---|---|---|
| 6,763,811 B1 | 7/2004 | Tamol, Sr. | |
| 6,851,413 B1 | 2/2005 | Tamol, Sr. | |
| 7,021,569 B1* | 4/2006 | Ogura et al. | 239/585.4 |
| 2004/0251327 A1* | 12/2004 | Messerly et al. | 239/690.1 |
| 2009/0008480 A1* | 1/2009 | Cooke | 239/533.12 |

OTHER PUBLICATIONS

International Application No. PCT/US2011/047030; International Preliminary Report on Patentability and Written Report; Date of Mailing Feb. 21, 2013; 7 pages.

PCT Search Report and Written Opinion; Application No. PCT/US2011/047030; mailed Nov. 18, 2011; 11 pages.

Article; iPowdercoating.com; Tribo-charge gun vs. Corona Spray Gun; 2 pages; date unknown.

Article; www.danforthfilter.com; Air Filter and Air Filtration Technology; 2 pages; date unknown.

Article; Triboelectric Separation of Binary Plastic Mixture; World Acadamy of Science and Technology ; M. Saeki; 4 pages; date unknown.

Article; A Basic Triboelectric Series for Heavy Minerals from Inductive Electrostatic Separation Behavior; A Basic Triboelectric Series for Heavy Minerals; D.N. Ferguson; The South African Institute of Mining and Metallurgy, 2009; 2 pages; date unknown.

Article; Static electricity; www.en.wikipedia.org; 5 pages; date unknown.

Intent to Grant communication dated Dec. 18, 2013; European Application No. 11745674.9-1603; 25 pages.

* cited by examiner

DIPOLE TRIBOELECTRIC INJECTOR NOZZLE

This application claims the benefit of U.S. Provisional Patent Application No. 61/372,292, filed Aug. 10, 2010. This provisional application is incorporated by reference herein in its entirety.

The field of the invention is fuel injector/carburetor nozzles for use in internal combustion engines.

BACKGROUND

Much work has been done with a goal of creating small fuel particles that create a homogeneous mixture that is more readily combusted in an internal combustion engine. One area that is being actively investigated is that of Radical Activated Combustion (RAC). In this configuration, fuel free radicals are introduced into the combustion chamber to enhance combustion. Successful demonstration of such a condition in a two cycle engine has been demonstrated. The two cycle cylinder retains free radicals from the previous combustion cycle and combustion occurs without a spark plug as an ignition source. The cylinder is in effect full of many thousands of "spark plugs" that initiate combustion in the cylinder.

Another engine type is referred to as a Homogeneous Charge Compression Ignition Engine (HCCI). The engine attempts to create a diesel like configuration with a similar homogeneous gasoline mixture. The means of initiating combustion throughout the complete range of driving conditions from low load to high load remains a problem with this engine.

Soot formation in a diesel engine primarily occurs at the first stage of introduction of fuel into the hot compressed air in the cylinder. Diesel engine development activities to eliminate soot formation have been centered on producing small fuel particles by increasing fuel injector pressure to extremely high pressure. The resulting fuel supply system in the modern diesel engine can be as high as 35% of the total cost of the engine proper. Only incremental results have been achieved and modern "clean" diesels require a particulate trap and an oxide of nitrogen trap that require regeneration. Government mandated emission requirements continue to be increasingly more stringent.

SUMMARY

Accordingly, it is an object of the present invention to provide a fuel injector with a nozzle having electric and, optionally, magnetic fields formed therein to improve the condition of the fuel and fuel/air mixture for combustion.

DETAILED DESCRIPTION

Figure 1:
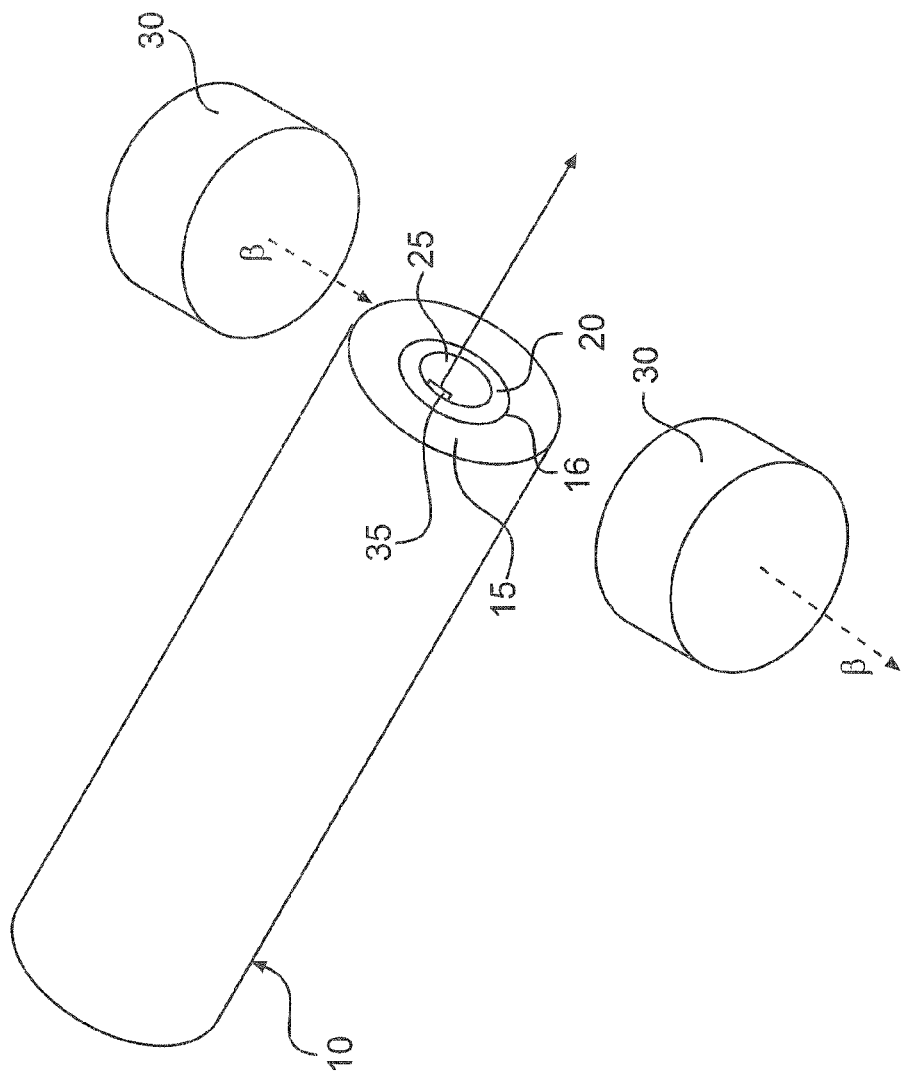
FIG. 1 is a perspective view of an example of a dipole nozzle for a fuel injector as described herein.

In its most simple terms, the present invention describes a fuel injector that treats a fluid such as an internal combustion fuel or fuel/air mixture with electric and, optionally, magnetic fields. By subjecting these fuels to both electric and magnetic fields, a homogeneous charged fuel or fuel/air mixture is made available for combustion in the internal combustion engine. The electric field is generated by a triboelectric dipole, and the magnetic field is supplied by permanent magnets. The resulting charged fuel particles that are treated accordingly will combust more readily than untreated fuel particles. This treatment of the fuel or fuel/air mixture takes place in a fuel injector, and specifically in the nozzle of a fuel injector at or near the intake of that fuel or fuel/air mixture into a combustion cylinder.

For purposes of this disclosure, the term injector is used broadly to encompass fuel injectors, used for instance in direct injection gasoline engines or conventional injection engines, and carburetor nozzles used to feed fuel into a carburetor. These injectors and nozzles can be engineered for use by original equipment manufacturers or for use in after-market parts for existing vehicles.

Certain materials, especially dielectric plastic surfaces, will become charged when in contact with flowing materials such as a dielectric fuel. The charge can be either positive or negative. The sign of charge is illustrated by the placement of the material on a triboelectric scale. A partial list of materials in the triboelectric series is set forth in the following Table 1.

TABLE 1

| TRIBOELECTRIC SERIES | |
| --- | --- |
| POSITIVE | NEGATIVE |
| Most Positively Charged | 0 |
|  | Least Negatively Charged |
| + | WOOD |
| AIR | ACRYLIC |
| GLASS | POLYSTYRENE |
| QUARTZ | HARD RUBBER |
| MICA | NICKEL, COPPER |
| LEAD | SULFUR |
| SILK | BRASS, SILVER |
| ALUMINUM | GOLD, PLATINUM |
| PAPER | ACETATE |
|  | SYNTHETIC RUBBER |
| Least Positively Charged | POLYESTER |
|  | STYRENE (STYROFOAM) |
| 0 | ORLON |
|  | POLYURETHANE |
|  | POLYETHYLENE |
|  | POLYPROPYLENE |
|  | VINYL (PVC) |
|  | SILICON |
|  | TEFLON |
|  | SILICONE RUBBER |
|  | Most Negatively Charged |

It should be noted that a number of metals are identified in the triboelectric series. These metals are typically not as effective as, for instance, the dielectric materials in the list including glass and various polymers (plastics). The metals are typically very conductive and will disperse quickly the triboelectric charges formed. On the other hand, the dielectric materials will tend to hold the charges better and, therefore, create a stronger electric field.

Charged materials of opposite charge, when positioned parallel to one another, form a dipole consisting of an electron voltage strength depending on the difference in opposite field strength. The voltage strength of the two would be additive and can be in the thousands of volts. Charged particles exiting a nozzle and charged to a Rayleigh limit deform into a conical shape in the so called Taylor zone. The fluid breaks up into an enormous number of sub-micron droplets at the tip of this zone. A homogeneous fuel mixture is a result.

Referring to the triboelectric table, any material from either the positive or negative ranking would create the dipole. A surface of glass that is rated on the high end of the plus charge scale would be a good match for Teflon that is near the strongest negative charge on the scale. The strength of the opposite electric fields is additive and field strength is inversely proportional to the distance from the charged surface. In the case of the dipole, the closer the surfaces, the higher will be the electric field. Opposite electric field polarity creates multiple lines of force and the strongest field.

Fluid flow velocity is an important factor in charging the fuel fluid. The higher the velocity, the greater will be the generated charge. The smaller the area of the fuel path along with a corresponding small exit orifice, the greater the charge. These charges are typically referred to in these relativistic terms, because it is difficult to quantify the charges in view of the numerous, dynamic variables.

The only known commercial application of triboelectric charging is in powder paint coating. The powder spray gun charges the paint particles by either a high voltage corona discharge at the spray-gun exit or the spray gun internal surface can be a single triboelectric surface such as Teflon which charges the paint particles by contact. This is a single field charging mechanism and not a triboelectric dipole electric field that treats a liquid as described herein.

One example of a triboelectric dipole would be Pyrex glass as the positive surface and Teflon as the negative surface. Both are at the high end of their respective scale charge on the triboelectric scale. In addition both materials can withstand temperatures in excess of 400° F. which is beneficial in an internal combustion engine setting.

While the exact electric field in a dipole configuration is difficult to measure, single surface triboelectric surfaces are measured at or in excess of 1,000 volts. In one example, the electric field strength is from about 200 to 10,000 volts/meter, or alternatively, about 500 to 5000 volts/meter. In a dipole configuration, the two voltages, each separately 1,000 volts, would be additive as per the electrical lines of force mentioned above and would create electric fields in the 10,000 plus volts/meter range especially at small distances of separation. In another example, the field strength is from about 200 to 20,000 volts/meter, or alternatively, about 3000 to 5000 volts/meter.

A magnetic field component is also applied to the particles that exit the nozzle. The stronger the magnetic field the better. Magnetic field strength drops exponentially with distance. Therefore it is desirable to have a minimum magnet distance from the fluid stream and nozzle exit orifice location. The magnet strength of the permanent magnets may be from about 400 gauss to 15,000 gauss, or alternatively, from about 1000 to 10,000 gauss, or about 5000 to 8000 gauss.

Permanent rare earth magnets of high strength are placed in series proximate a point where their magnetic field covers flow at the exit orifice of charged fuel particles from the nozzle. These magnets have a preferred orientation perpendicular to the electric field at the end of the triboelectric nozzle surface. There is a benefit to placement of a perpendicular orientation of perpendicular electric and magnetic fields. When an electric field and a magnetic field are perpendicular to one another, a Lorentz force is created perpendicular to these fields. This force acts on the fuel particles with a pumping action. The literature refers to such a configuration as a "Magnetoplasmadynamic Thruster" to generate thrust on particles. The thrust will be particularly useful when the nozzle is used in a carbureted, aspirated engine where nozzle pressure drop is solely dependent on atmospheric pressure. A dynamic pump-nozzle is a result.

When two magnets are used, they are positioned on substantially opposite sides of the nozzle orifice. They are oriented with respect to each other in opposite polarities to obtain a maximal magnetic field strength between them. When oriented with opposite polarities, an additive magnetic field strength is obtained.

The magnet or magnets may be inserted into pockets or grooves machined into the nozzle at the end or otherwise proximate the nozzle orifice. Alternatively, the specific landscape where a nozzle is mounted may allow for other mechanisms structures where the magnets may be positioned proximate the orifice/end of the nozzle. Exemplary distances of the magnet or magnets from the exit orifice of a nozzle can be about 0.05 to 1.0 inches; or alternatively about 0.1 to 0.5 inches. This distance may vary depending on the strength of the magnet(s) used. For a magnet having a strength of about 4000 gauss, the mounting distance from the exit orifice can be about 0.1 to 1.5 inches.

The following parameters are believed to be relevant to maximize the triboelectric nozzle to effect non-thermal plasma treatment of a dielectric fluid flowing and exiting the nozzle. This list is non-limiting in that additional or less than all of the parameters may apply in every case.

1. For maximum electric field strength, the separation of positive and negative materials on the triboelectric scale should be maximized in forming the dipole materials.

2. Minimum distance should be configured between triboelectric materials for maximum electric field strength. Electric field strength may be in the 200-15,000 volts/meter, or alternatively 1000 to 5000 volts/meter.

3. Minimum flow path volume results in for maximum flow velocity to achieve maximum accumulated charge on the dielectric fuel. The orifice depth should be in the 0.001 inch and below range depending on allowable pressure drop. Orifice range could be 0.001-0.060, inches, or alternatively, 0.005 to 0.01 inches.

4. Maximum magnetic strength of permanent magnets should be in the range of 400 gauss to 15,000 gauss. Rare earth magnets are selected from two groups consisting of Samarium-cobalt, Neodymium-iron-boron.

5. Minimum distance between opposite polarities of magnets at the point of flow discharge is an advantage.

6. Maximum allowable pressure drop of fuel and fuel/air flow from the nozzle is an advantage.

7. Location within the engine with respect to temperature and pressure conditions of operation should be optimized for the respective nozzle location. Because engine conditions may be hot, it could be favorable to use Pyrex glass that can withstand temperatures in excess of 600° F., Teflon for 400° F. and Samarium rare earth magnet for 350° C.

EXAMPLE

An experimental single cylinder test engine was set up to test a carburetor incorporating a nozzle as described herein. The engine was a single cylinder Briggs & Stratton engine of 6.5 HP. The carburetor was one of experimental design that had two air flow sections. One was a primary air flow that included a venturi section where an experimental ejector would be placed in the venturi air stream and the corresponding flow vacuum would raise the fuel from a gasoline supply line through the jet and discharge into the primary air supply. A secondary airstream was supplied to a mixing chamber beyond the venturi jet to mix additional air before the total flow entered the cylinder by aspiration. A series of valves allowed the air streams to be manipulated to find optimum conditions.

The valves allowed operation of the engine throughout its operating range to over 3500 RPM with a 0.003 inch deep fuel delivery orifice. Examination of the engine cylinder inlet at the carburetor feed point showed that apparently combustion was occurring in the intake manifold proper. This indicated that it would be desirable to retard the engine timing to have all combustion occur in the cylinder proper. This observation would be expected if the homogeneous charge expected had occurred. It is desirable to have the power stroke occur after top dead center (ATDC) for maximum power delivered to the crank shaft.

The success of this investigation was that the extremely small orifice with only one jet (nozzle) could supply the engine for full RPM operation. A viable triboelectric dipole nozzle was demonstrated.

Figure 2:
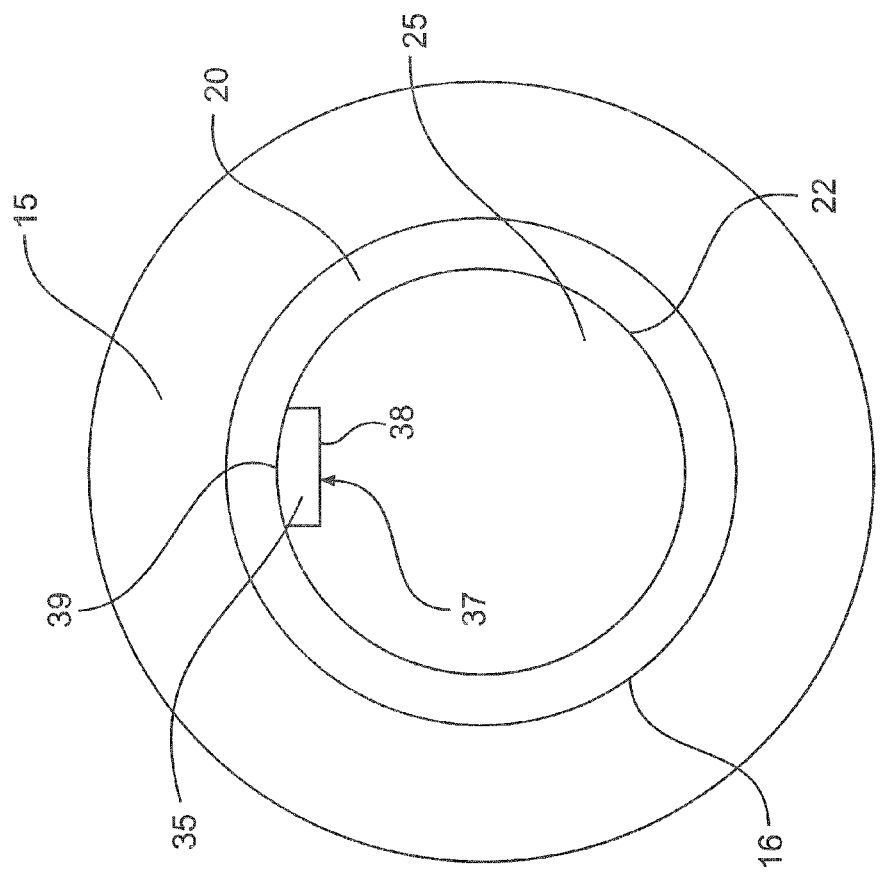
FIG. 2 is a front view of the dipole nozzle shown in FIG. 1.

Turning now to the drawings, FIGS. 1 and 2 show a nozzle having a construction that includes a dipole passageway through which fuel and fuel/air mixture may pass. The nozzle 10 includes an aluminum support barrel 15 having a circular bore 16 there through. Coated along the inside surface of the bore 16 that passes through the aluminum barrel 15 is a polymer coating 20. In this example, the coating is polytetraflouroethylene (PTFE or Teflon). Positioned inside the bore 16 is a glass tubular insert 25. In this example, the glass insert 25 is made of Pyrex. Alternatively, the glass insert 25 has a Teflon film 20 that is shrink-wrapped around it and that is then inserted into the bore 16. Either way, the two different triboelectric materials define the groove/passageway 37 through which the fuel flows. The outside diameter 22 of the Pyrex 25 is the same as or slightly less than the inside diameter of the Teflon coating 20. The Pyrex insert 25 also includes a groove 37 that is positioned along the longitudinal length of the insert 25. The groove 37 defines an opening or orifice 35. It is in this groove 37 and then from the orifice 35 that fuel and fuel/air mix flows from the nozzle 10. As shown, the groove 37 has a substantially flat bottom 38.

In this example, the orifice 35 is 0.003 inches deep. That is, the bottom 38 of the Pyrex insert 25 is substantially parallel with and 0.003 inches from the portion of inside diameter 39 of the coated bore 16. The width of the orifice 35 is 0.06 inches.

As shown in FIGS. 1 and 2, there is a single orifice 35 in the nozzle 10. Of course there could be multiple orifices that could be designed and engineered around the circumference of the insert 25. Likewise, the single groove 37 is shown in the insert 25. Alternatively, another groove, or a plurality of grooves, could be engineered in the coating layer 20. Still further, the groove 37 could be a result of a partial groove in the insert 25 and in the coating layer 20.

The orifice 35 should be relatively narrow so that the surfaces of triboelectric materials on opposite sides of the orifice will be close together. This enables a superior array and better electric field forming during the flow of fuel and fuel/air through the passageway and out the orifice 35. The depth of the orifice and passageway may be from about 0.001 to 0.1. Alternatively, the depth of the orifice and passageway may be from about 0.002 to 0.01.

As shown, the insert 25 is made from Pyrex (glass), and the coating 20 is made from the polymer Teflon. It is alternatively possible that the coating 20 could be made of glass and the insert 25 made from Teflon. In fact, alternative materials could be used. As discussed earlier, it is best that the respective materials on opposite sides of an orifice and passageway would be differently charged as shown in the triboelectric series scale. One side of the orifice and passageway would be a material taken from the positively charged series, while the other side of the orifice and passageway would be selected of a material from the negatively charged triboelectric series.

Figure 3:
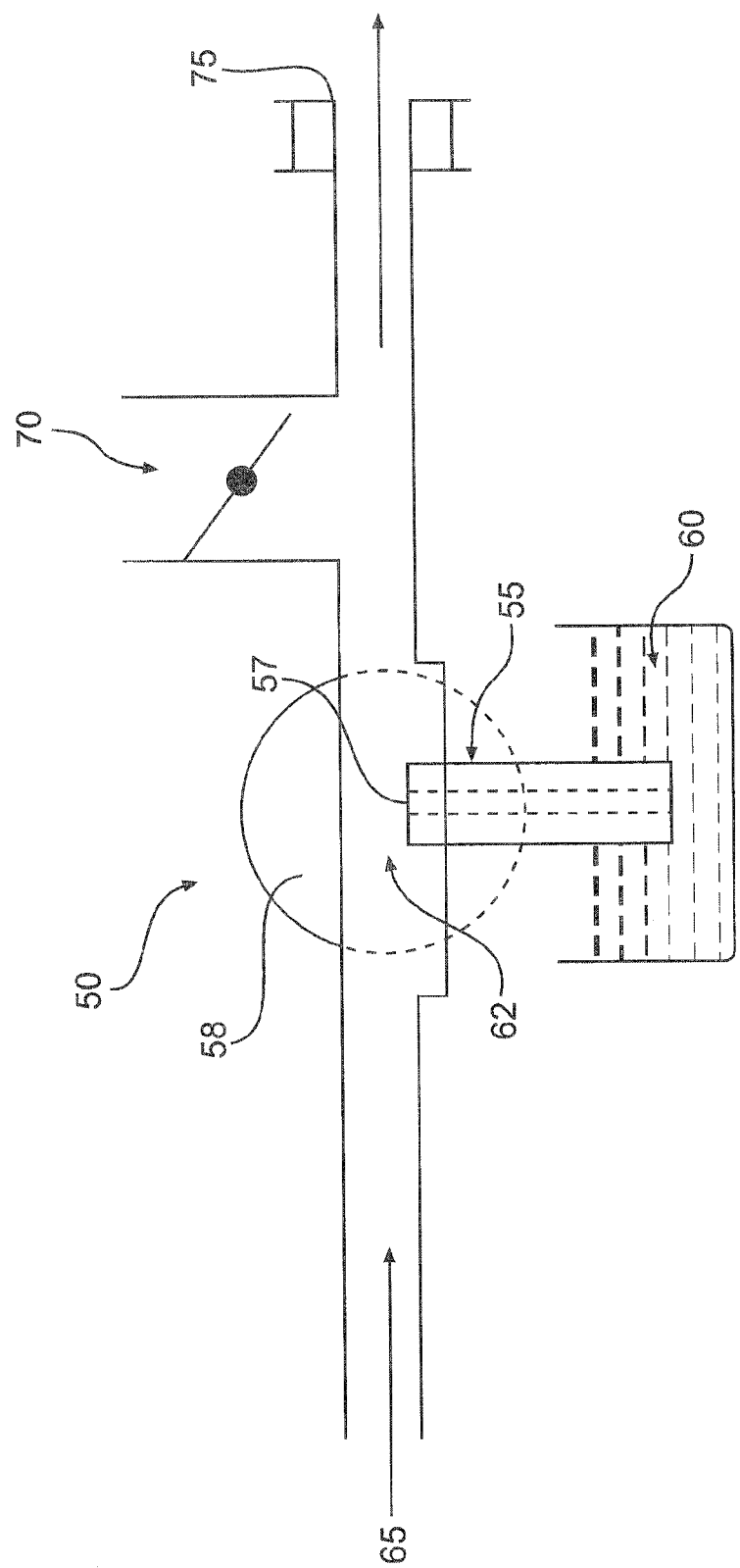
FIG. 3 is a schematic view of a carburetor system that includes a nozzle as described herein.

Turning now to FIG. 3, there is shown the nozzle 55 within the system for a carburetor 50. The nozzle 55 is set in a fuel bowl 60 and draws the fuel into the venturi section 62 of a carburetor 50. Primary air flow 65 mixes with the fuel that passes through the nozzle 55 and mixes with the secondary airflow 70. The fuel/air mixture is then fed in through the engine inlet 75 into a combustion chamber. The nozzle 55 has an orifice 57 from which the fuel in the fuel bowl 60 is sprayed in the airflow 65. As also shown in FIG. 3, magnets 58 are paired on each side of the air and fuel/air flow to create a magnetic field proximate the orifice 57 of the nozzle 55.

Figure 4:
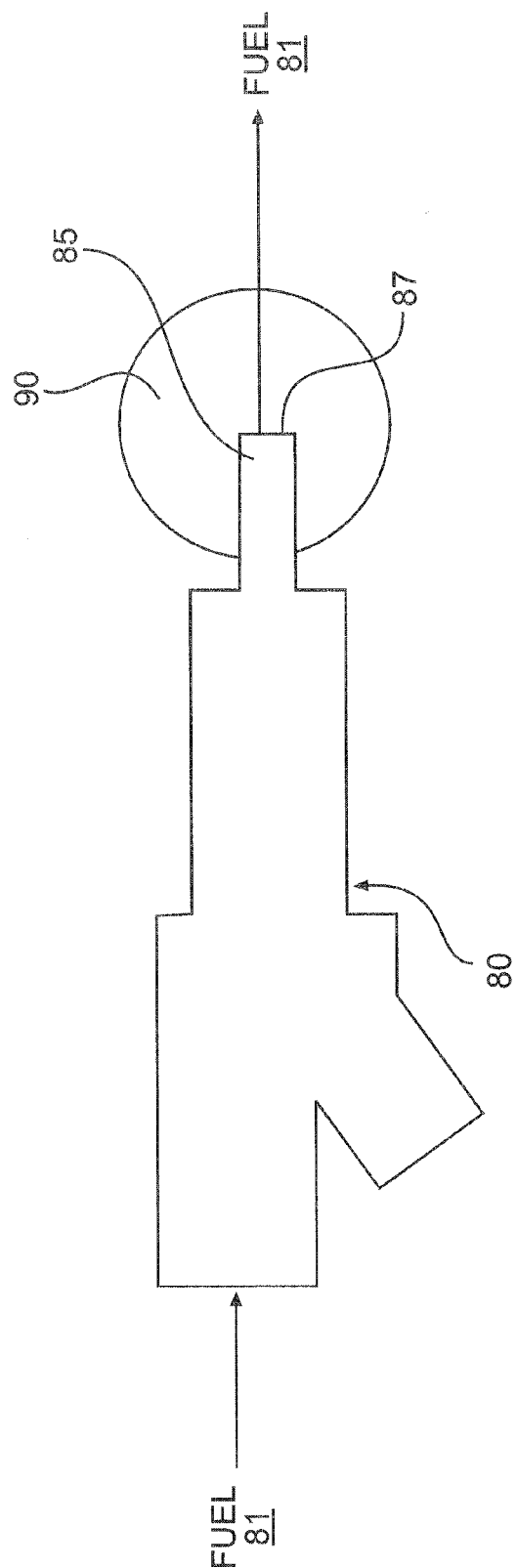
FIG. 4 is a schematic view of an electronic fuel injector having a nozzle as described herein.

FIG. 4 is a schematic drawing of a fuel injector 80. The fuel 81 passes through the injector and through a nozzle 85 and out an orifice 87. As shown, magnets 90 are positioned proximate the orifice 87 from which the fuel 81 is ejected.

Other embodiments of the present invention will be apparent to those skilled in the art from consideration of the specification. It is intended that the specification and Figures be considered as exemplary only, with a true scope and spirit of the invention being indicated by the following claims.

What is claimed is:

1. A fuel injector for use in an internal combustion engine, the injector comprising:
    a nozzle having a passageway there through where fuel is adapted to pass through the passageway;
    wherein the passageway is defined by two or more walls, a first wall comprised of a first material in the positively charged triboelectric series and a second wall comprised of a second material in the negatively charged triboelectric series; and
    an orifice at an end of the passageway, the orifice being an opening from which fuel is adapted to exit the nozzle.

2. A fuel injector as described in claim 1, wherein the first and second walls are substantially on opposite sides of the passageway.

3. A fuel injector as described in claim 2, wherein the first and second walls each comprise substantially parallel portions, and the distance between the parallel portions of the first and second walls is from about 0.001 to 0.06 inches.

4. A fuel injector as described in claim 3, wherein the first and second walls each comprise substantially parallel portions, and the distance between the flat portions of the first and second walls is from about 0.001 to 0.01 inches.

5. A fuel injector as described in claim 1, wherein the first material is selected from the group consisting of glass, quartz, nylon, lead and aluminum.

6. A fuel injector as described in claim 1, wherein the second material is selected from the group consisting of acrylic, polystyrene, rubber, nickel, copper, silver, gold, platinum, acetate, polyester, styrene, polyurethane, polyethylene, polypropylene, vinyl, silicon, Teflon and silicone.

7. A fuel injector as described in claim 1, comprising a first magnet mounted on the nozzle proximate the orifice, whereby fuel passing through the orifice is subject to a magnetic field from the magnet.

8. A fuel injector as described in claim 7, further comprising a second magnet mounted on the nozzle proximate the orifice and on the opposite side of the orifice from the first magnet.

9. A fuel injector as described in claim 8, wherein the magnet strength of each of the first and second magnets is from about 400 gauss to 15,000 gauss.

10. A fuel injector as described in claim 8, wherein the magnet strength of each of the first and second magnets is from about 1000 to 10,000 gauss.

11. A fuel injector as described in claim 8, wherein the magnets are permanent magnets selected from the group consisting of samarium-cobalt and neodymium-iron-boron magnets.

12. A fuel injector for use in an internal combustion engine, the injector comprising:
   a nozzle having a passageway there through where fuel is adapted to pass through the passageway;
   a circular bore through the nozzle, the bore having a first material coating thereon, the coated bore defining a first inside diameter,
   a generally circular cross-section insert of a second material having an outside diameter about the same or slightly smaller than the inside diameter of the coated bore, further wherein the insert is positioned in the bore,
   wherein the insert has a longitudinal groove in the surface thereof,
   further wherein the groove and an adjacent surface of the coating on the bore form the passageway through the nozzle,
   wherein the first material coating is comprised of a material in the triboelectric series, and the insert is comprised of a second material in the triboelectric series, the coating and the insert having opposite charges in the triboelectric series, and
   an orifice at an end of the passageway, the orifice being an opening from which fuel is adapted to exit the nozzle.

13. A fuel injector as described in claim 12, wherein the groove in the insert comprises a bottom surface substantially parallel to the bore coating surface, and the distance between the bottom surface and the bore coating surface is from about 0.001 to 0.06 inches.

14. A fuel injector as described in claim 12, wherein the groove in the insert comprises a bottom surface substantially parallel to the bore coating surface, and the distance between the bottom surface and the adjacent surface of the bore coating is from about 0.001 to 0.01 inches.

15. A fuel injector as described in claim 12, wherein the bore coating material of the insert is selected from the group consisting of glass, quartz, nylon, lead, and aluminum.

16. A fuel injector as described in claim 12, wherein the second material of the insert is selected from the group consisting of glass, quartz, nylon, lead, and aluminum.

17. A fuel injector as described in claim 12, wherein the bore coating material is selected from the group consisting of acrylic, polystyrene, rubber, nickel, copper, silver, gold, platinum, acetate, polyester, styrene, polyurethane, polyethylene, polypropylene, vinyl, silicon, Teflon and silicone.

18. A fuel injector as described in claim 12, wherein the second material of the insert is selected from the group consisting of acrylic, polystyrene, rubber, nickel, copper, silver, gold, platinum, acetate, polyester, styrene, polyurethane, polyethylene, polypropylene, vinyl, silicon, Teflon and silicone.

19. A fuel injector as described in claim 11, comprising a first magnet mounted on the nozzle proximate the orifice, whereby fuel passing through the orifice is subject to a magnetic field from the magnet.

20. A fuel injector as described in claim 19, further comprising a second magnet mounted on the nozzle proximate the orifice and on the opposite side of the orifice from the first magnet.

* * * * *